United States Patent [19]

Tolanda

[11] Patent Number: 4,457,382
[45] Date of Patent: Jul. 3, 1984

[54] DEVICE FOR SUPPORTING AND GUIDING A WORKING TOOL

[75] Inventor: Milan Tolanda, Libina, Czechoslovakia

[73] Assignee: Vitkovice, Unicovske strojirny koncernovy podnik, Unicov, Czechoslovakia

[21] Appl. No.: 431,122

[22] Filed: Sep. 30, 1982

[30] Foreign Application Priority Data

Oct. 2, 1981 [CS] Czechoslovakia ............. 7223-81

[51] Int. Cl.³ ............................................. E21B 7/02
[52] U.S. Cl. ..................................... 173/22; 180/65.5; 219/124.31; 219/125.12; 266/67
[58] Field of Search ............. 173/22; 408/76, 77, 408/78, 137; 180/65 F; 280/206; 219/125.12, 124.31, 124.1; 266/67, 73, 77; 269/8; 29/281.6; 228/47, 48, 57

[56] References Cited

U.S. PATENT DOCUMENTS

| | | | |
|---|---|---|---|
| 2,456,444 | 12/1948 | Reid et al. | 266/67 |
| 2,467,940 | 4/1949 | Livesay | 266/67 |
| 3,201,561 | 8/1965 | Damon | 219/124.31 |
| 3,450,398 | 6/1969 | Barnes et al. | 266/67 |
| 3,704,759 | 12/1972 | Vitkov et al. | 180/65 F |
| 4,131,783 | 12/1978 | Kensure et al. | 219/125.12 |
| 4,151,390 | 4/1979 | Bisiach | 219/124.1 |
| 4,195,947 | 4/1980 | Lambertz | 180/65 F |
| 4,330,109 | 5/1982 | Coughlin et al. | 266/67 |
| 4,331,278 | 5/1982 | Sherer et al. | 219/124.31 |
| 4,371,107 | 2/1983 | Watanabe et al. | 219/124.31 |

Primary Examiner—E. R. Kazenske
Assistant Examiner—Hien H. Phan

[57] ABSTRACT

Portable working device for supporting and guiding a working tool, particularly a welding or burning torch. The device has a bogie with a single tube-like axle, the supporting traveling wheels of which are magnets with pole shoes with independent drives. The holder of the working tool is fixed to an arm slidingly arranged within the bogie axle. Since the force maintaining the bogie wheels is magnetic when the workpiece is ferromagnetic, the device is of relatively low weight and is capable of operating in any position. As no part of the device extends beyond the diameter of the supporting traveling wheels, its working range is very extensive.

10 Claims, 3 Drawing Figures

DEVICE FOR SUPPORTING AND GUIDING A WORKING TOOL

BACKGROUND OF THE DISCLOSURE

This invention relates to a portable device for supporting and guiding a working tool, for example a burning torch for the heat separation of material or a welding nozzle such as a semiautomatic welding arrangement operating in a protective $CO_2$ atmosphere, and the like.

Actually known portable working devices, for example for the clamping and guiding of torches for burning by means of oxygen are of various designs. One of the known arrangements of such prior devices comprises a guiding rail along which a slidable support is guided by guiding rollers, the slidable support being provided with a drive by means of a pinion engaging a rack on the guiding rail. The torch is clamped on the supporting arm fixed on the slidable support.

A drawback of the above-described known arrangement is that the working range of the torch is limited by the shape of the rail, such rail being straight and extending in advance of the slidable support. The use of this arrangement in internal and external spaces of welded objects is frequently limited by the length of the guiding rail. Another drawback of such arrangement is that in case of an undulating or curved surface of the work piece deviations of the shape are encountered when making bevels bevels for weldings. The same drawbacks are encountered in the case of separating of material having a complicated surface, since the guiding rail, due to its rigidity, can not be readily deformed to follow such surface.

There is furthermore a known arrangement without a guiding rail wherein wheels of a bogie move along the the worked material with the possibility of being guided along rails. These arrangements are usually provided with two axles, one of which is a guiding axle, with a drive situated beyond both axles. The torch carried by the device is disposed beyond the axles of the traveling wheels of the bogie.

A drawback of this known arrangement is that in order to secure a sufficient thrust on the traveling wheels of the bogie to prevent their slipping upon the workpiece, the arrangement has to have a heavy weight; a consequence of this is a limitation of the manner of use of the arrangement to horizontal surfaces, and at most possibly the surfaces having a slight inclination with respect to the horizontal. The minimum length of this arrangement is at least twice the diameter of the traveling wheels. A consequence of this is the fact that the torches prevented from working upon a very considerable length of the track of operation of the arrangement.

SUMMARY OF THE INVENTION

The present invention has among its objects the elimination of the above-mentioned drawbacks of the prior art arrangements. The arrangement according to the present invention has a single axle bogie comprising supporting traveling wheels rotatable arranged on the bogie axle and provided with individual drives for the traveling wheels between or inside such wheels, such drive having a diameter of which does not exceed the diameter of the wheels. Each of the traveling supporting wheels is provided with at least two pole shoes and magnets, for instance permanent magnets, whereby within the bogie axle there is provided at least one supporting arm for a holder of a working tool, and in addition there is provided means for receiving the reaction of the turning moment imposed upon the bogie. The external circumference of the pole shoes of the supporting traveling wheels can be roughened or serrated to improve the grip between them and the workpiece. As an alternative, the pole shoes can be of disc shape and supported on their inner circumferences on hubs of the supporting traveling wheels by means of resilient elements. The magnets can also be provided with resilient elements on their external surfaces, whereby to increase the grip between them and the workpiece.

The supportng arm for the tool can be rotatably supported coaxially within the bogie axle and be provided with a stop whereby to adjust the angle at which the holder of the working tool is supported on such arm. A working tool holder is provided with a threaded sleeve or nut threadedly receiving a motion screw which is drivingly connected either to a motor drive, to a manual drive, or possible also selectively connected to either of such drives. Cams provided with slidable cam following pins pointing towards the face of the supporting traveling wheels may be rotatably arranged on the bogie axle at the external side of supporting traveling wheels, the cams being interconnected by a holder. A pick-up device acting in the direction of travel of the supporting traveling wheels can be provided on the bogie axle. The holder of the working tool can be provided with a pick-up device which detects the position of the supporting arm.

Among the advantages of the portable working device according to the present invention is the fact that the weight of the arrangement which in the prior art prevented slipping of the traveling wheels upon the workpiece is replaced by the force of a magnet field between the supporting traveling wheels and a ferromagnetic workpiece. Thus an arrangement of low weight is obtained, requiring for its drive less power with small dimensions of the drive, and thus enabling the drive for the traveling wheels to be disposed within the space of the wheels, which are mounted upon the single axle of the bogie. As the supporting arm of the holder of the working tool is arranged within the axle of the supporting traveling wheels of the single axle bogie, the operating length of use of the working tool, for instance a torch, is practically without limitation as compared to former, known arrangements of such devices.

Another advantage of the low weight of the arrangement according to the invention is that the device may also travel along vertical planes, including planes disposed overhead, without the requirement of using a guiding rail for the arrangement. The single axle embodiment of the arrangement according to the invention permits a continuous transfer of the arrangement between different planes even though the workpiece may have a rather uneven surface, since the supporting arm of the tool holder is situated in the center of the supporting traveling wheels of the bogie, a considerable distance between the torch and the workpiece is provided.

The resilient support of the pole shoes of the supporting traveling wheels on the hub of the wheels, in one embodiment of the invention, permits a slight change in the position of the pole shoe in case it strikes dirt on the surface of the workpiece without any appreciable change of the position of the holder. A deviation of the torch in the case of striking dirt on the surface of the workpiece is also prevented in the embodiment of the device wherein the external surfaces of the pole shoes are roughened or serrated. A further advantage of the device according to the invention is that by using independent drives for the supporting wheels disposed on a common axis, a change of the travel of the device in any required direction can be achieved. It is to be understood that different pick-up devices can be employed for this purpose.

DESCRIPTION OF THE DRAWINGS

A preferred embodiment of the device according to the invention is schematically shown in the accompanying drawings, in which:

FIGS. 1 and 2 when assembled to align the left-hand end of the member 14 as shown in FIG. 2 with the right-hand end of member 14 shown in FIG. 1 constitutes a complete diagrammatic illustration of the device.

DESCRIPTION OF THE PREFERRED EMBODIMENTS

Figure 1:
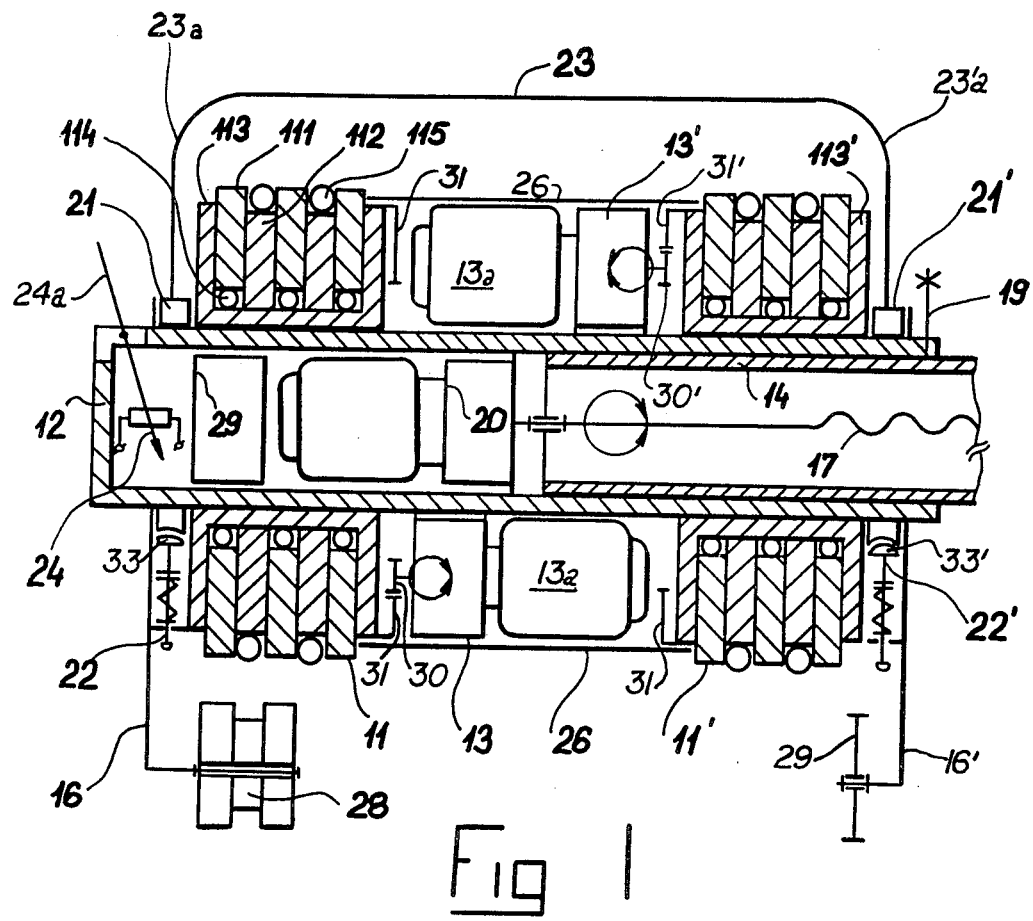
FIG. 1 is a fragmentary view partially in elevation and partially in section of the disclosed embodiment of the tool supporting and guiding device of the invention.

The illustrative portable working device has a bogie with a single tube-like axle 12 upon which there are rotatably supported axially spaced sets 11 and 11' of supporting traveling wheels. Wheel sets 11 and 11' are provided with independent driving means 13 and 13', respectively, disposed outwardly of the hollow axle and axially between the supporting traveling wheel sets 11 and 11'. The parts making up such respective drives are designated with the same reference characters with the exception that the parts of the drive 13' are designated by reference characters with an added prime. In the drive 13, a motor 13a drives through a gear means the outward shaft of which has a pinion 30 mounted thereon. Pinion 30 meshes with an internal ring gear 31 which is afixed to the hub 113, which is rotatably mounted with respect to the axle 12, the hub bearing the elements making up the set 11 of traveling wheels. The independent drives 13, 13' are situated between the supporting traveling wheel sets 11, 11' along the circumference of the axle 12 of the bogie, and do not extend beyond the external diameter of the sets of supporting traveling wheels 11, 11'. The independent drives 13, 13' are protected by a covering tube 26 disposed between the sets 11, 11' of the supporting traveling wheels and having an outer surface disposed radially inwardly of the rims of such traveling wheels.

Each of the sets of supporting traveling wheels 11, 11' is rotatably supported by its respective hub 113, 113' on the bogie axle 12 and is composed of at least two pole shoes with magnets, for instance permanent magnets. A description of traveling wheel set 11 will suffice, since sets 11 and 11' are identical. In wheel set 11 there are two pole shoes 111 provided with magnets 112. The external circumference of the pole shoes 111 of the supporting traveling wheels 11 is roughened, as for instance by being serrated. The pole shoes 111 are supported at their internal circumference on hub 113 by means of toroidal resilient elements 114. The magnets 112 are provided on their external circumferences with resilient toroidal elements 115. The resilient elements 114 and 115 can be, for instance, O-rings of circular cross section.

Figure 2:
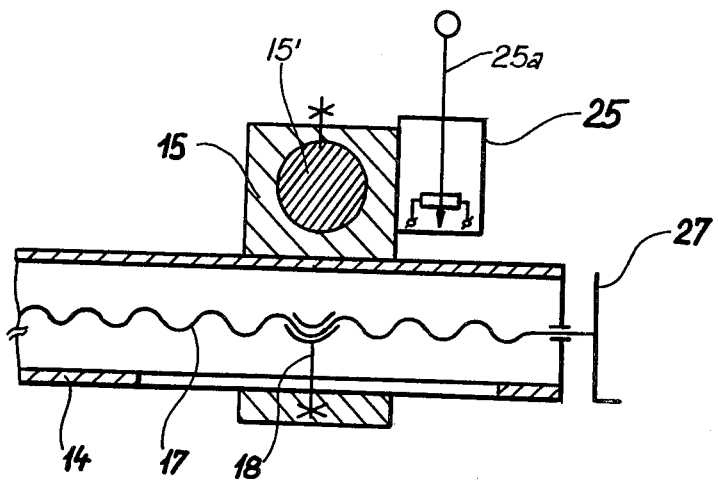
FIG. 2 is a fragmentary view partially in elevation and partially in section of the portion of the device wherein the holder for the working tool is clamped upon the supporting arm therefor.

Within the tube-like axle 12 of the bogie there is arranged at least one tubular supporting arm 14 for a holder 15 of the working tool as shon in FIG. 2 taken with FIG. 1. Holder 15 has a bore therein within which there is disposed a stem or shank 15' of a working tool (which is otherwise not shown), the stem or shank of the tool being secured in the holder by means of a set screw as shown. The supporting arm 14 is disposed coaxially of and within the axle 12 and is rotatable with respect thereto, there being provided a set screw 19 which provides for the angular adjustment of the supporting arm 14 with respect to the bogie axle 12. An elongated driving screw 17 is disposed within and coaxial of the hollow supporting arm 14. Screw 17 is connected to an independent drive 20, disposed, for example, within the bogie axle 12. The outer, right-hand end screw 17 may also be optionally provided, or both of such drives may be selectively employed. In case two supporting arms 14 are used, they are arranged at both ends of the bogie axis 12, rather than only at the right-hand end thereof as shown in FIGS. 1 and 2.

Means in the form of an arm 16 is provided for receiving the reaction of the turning moment exerted upon the bogie axle 12, arm 16 being a radially disposed bar attached at its radially inner end to the bogie axis 12 and at its outer end bearing a workpiece-engaging member 28 which may be provided with a magnet, possibly also with pole shoes, for instance in the shape of a rotatably supported roller. Means 16 for receiving the reaction of the turning moment are imposed upon the bogie axle 12 are disposed at both ends of the axle, the radially disposed bar 16' mounted on the right-hand end of the axle 12. It is to be understood that arms similar to arm 16, 16' can also be arranged between the sets of supporting traveling wheels 11, 11' where the drives 13, 13' are installed.

Ring-shaped cams 21, 21' are disposed upon the opposite ends of the bogie axis 12, such cams cooperating with radially slidable cam followers 22, 22', respectively. Cams 21, 21', which are of the same configuration, are rotatably mounted upon the bogie axle 12 in the same angular position with respect to the bogie axle 12. The cams 21, 21' are mutually interconnected by a bail-like holder 23, turning of the holder 23 about the axis of bogie axle 12 rotating the two cams 21, 21' to the same extent and in the same direction with respect to the bogie axle 12.

Figure 3:
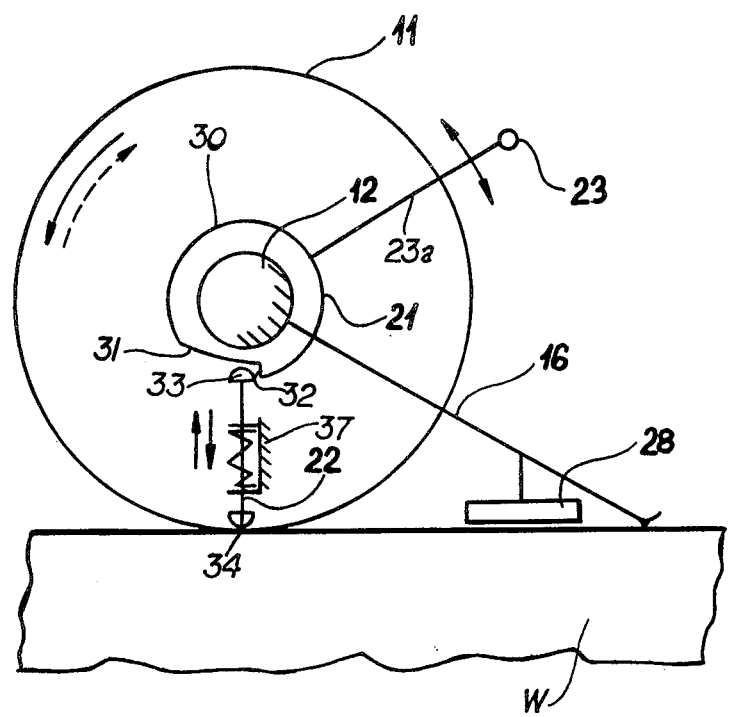
FIG. 3 is a schematic end view of the device, the view being taken in the direction from left to right in FIG. 1.

In FIG. 3 there are shown the cam 21 and the cam follower 22 cooperating therewith. The cam follower 22, which is mounted upon fixed structure 37, is resiliently urged radially toward the cam 21 by a coil compression spring as shown. The cam 21 has a part-circular external surface 30, which extends over the major part of the circumference of the cam, a flat chordally disposed surface 31, and an abrupt shoulder or stop 32 at the right-hand end of surface 31 as shown in FIG. 3. The cam follower 22 has a radially inwardly disposed, cam-following head 33 which cooperates with the cam 21, and a radially outer head 34 thereon. The dimensions of the parts are such that, when the holder 23 is rotated counterclockwise from the position thereof shown in FIG. 3 sufficiently for the cam following head 33 to engage surface 30 of the cam, the outer head 34 on the cam follower 22 lies radially outwardly beyond the periphery of the traveling wheels 11.

A direction pick-up device 24 for the electrical control of the direction of travel of the supporting traveling wheels 111, 11' is fixed to the bogie axle 12, as shown in FIG. 1. Pick-up device 24 has an operating arm 24a; the pick-up device 24 includes an electronic control device housed in a casing 29. The holder 15 of the working tool is provided with a position pick-up device 25 which determines the position of the holder 15 for the working tool on the supporting arm 14 and serves for the control of the drive 20 of the motion screw 17. The direction pick-up device 24 and the position pick-up device 25 are, for instance, each formed by a potentiometer with a finger for mechanically picking-up the shape of a pattern or of a ruler fixed to the workpiece. These devices can also be opto-electric in nature for picking-up a light beam, for instance, a laser beam, or for picking-up form plates or templates, or electromagnetic pick-up devices or the like. The form plate or template or the ruler may also be represented by the workpiece or by a part of it.

MANNER OF OPERATION OF THE DEVICE

When the device of the invention is applied, for example, to a workpiece W (FIG. 3) having a surface 36 to be worked upon, the cams 21, 21' are turned into the position thereof shown in FIG. 3 wherein the lower head 34 of the cam followers 22, 22' are raised above the surface 36. The cams 21, 21' are turned by means of the holder 23 to a position wherein the heads 33 of the cam followers engage surface 30 of the cams so that the outer heads 34 of the cam followers are pressed against the surface 36 of the workpiece W. This enables an easy location of the device upon the workpiece. Assuming that the workpiece is ferromagnetic, and that the means 28 on one or both of the arms 16, 16' include magnets, upon the turning of the holder 23 in a clockwise direction (FIG. 3) the heads 33 of the cam followers travel along the surface 31 until they are engaged by the stop shoulder 32, the heads 34 of the cam followers are raised from engagement with the surface 36 of the workpiece, and the supporting traveling wheels 11, 11' are pressed against the workpiece due to the magnetic forces exerted thereupon by the sets 11, 11' of the traveling wheels. The device may be removed from the workpiece by rotating the holder 23 counterclockwise so that the cams 21 thrust the cam followers 22 radially outwardly. The device can be operated to lift the supporting traveling wheels sets 11, 11' from the workpiece. Such action also removes means 28 and 29 from engagement with surface 36 of the workpiece.

After the device of the invention, bearing a suitable working tool, for instance a burning torch, has been applied to the workpiece the working conditions are adjusted. These include, for instance, the speed of travel of the device, and the application to the workpiece of the direction pick-up device 24 and the position pick-up device 25, so that the position of the working tool and the direction of travel of the device are determined.

After these adjustment have been made, the arrangement is brought into operation by control elements situated on the device, for instance on the holder 23 or on an additional control panel for the remote control of the arrangement. Electronic control devices may be arranged on the portable working device or removed therefrom and connected thereto by means of cables; such control devices maintain all movements of the device in accordance with adjusted values, such as forward or reverse directions of rotations of all electric motors, their continuous speed regulation, and the securing of the evaluation of deviations of the position of the device determined by the direction pick-up device 24 and by the position pick-up device 25. In some instances, the device may be operated without the use of pick-up devices 24 and 25, i.e. when the electric motors are maintained at a constant speed according to adjusted values, for instance for operation of the device in a straight direction. With selected different speeds of driving of the two traveling wheel sets 11, 11' the arrangement may be moved along a circular track, for example.

Occasional unevennesses are compensated for by the resilient elements 114 without deviation of the position of the working tool, for instance, of a torch. Slippage, particularly when the device is traveling along vertical planes is prevented by the roughening or serration of the external circumference of the pole shoes 111, where, due to concentrations of magnet lines of force on the points of the serrations the dirt, for instance metal powder, is pressed and maintained between these points so that they do not stick to the contact surface of the pole shoe 111. The adhesion is, in addition, increased by the resilient element 115 formed, for example, by a rubber ring of circular cross section arranged on the external circumference of magnets 112. Means 16 for receiving the reaction of the turning moment of the bogie axle at the place of contact with the workpiece are, in the exemplary embodiment, provided by making means 28 in the form of a magnet preventing a raising of means 16 above the surface of the workpiece. The magnetic linking of means 16 with the workpiece also enables the device to operate in an overhead or upside down position.

The arrangement of the invention can be utilized in all branches of machinery where welding or heat separation of materials are performed by the arrangement in portable form for guiding and supporting a welding or burning torch. The device provides a maximum operating length of the travel of the welding or burning torch, and meets the requirement of operation in all working positions. The arrangement according to the invention can, however, also be utilized for clamping and guiding working tools other than welding or burning torches.

Although the invention is illustrated and described with reference to one preferred embodiment thereof, it is to be expressly understood that it is in no way limited to the disclosure of such a preferred embodiment, but is capable of numerous modifications within the cope of the appended claims.

I claim:

1. A portable working device for supporting and guiding a working tool, comprising a bogie having a single axle, a plurality of sets of supporting traveling wheels rotatably supported on the axle, an independent drive for each of the sets of supporting traveling wheels, said independent drives being disposed radially inwardly of the circumference of the supporting traveling wheels, each of the supporting traveling wheels being formed by magnets provided with at least two pole shoes, at least one supporting arm for a tool holder of a working tool, and means for opposing the torque reaction of the working device arranged on the bogie axle.

2. A portable working device as claimed in claim 1, wherein said means for opposing the torque reaction is provided at the place of contact between at least one magnet and the workpiece.

3. A portable working device as claimed in claim 1, wherein the external circumferences of the pole shoes of the supporting traveling wheels are roughened.

4. A portable working device as claimed in claim 1, wherein the pole shoes are of toroidal formation and are supported on hubs mounted upon the bogie axis by means of circular resilient elements interposed between the hubs and the internal circumferences of the pole shoes.

5. A portable working device as claimed in claim 1, comprising resilient elements provided on the external circumferences of the magnets of the supporting traveling wheel sets.

6. A portable working device as claimed in claim 1, wherein the bogie axle is of tube-like form, the supporting arm of the tool holder is rotatably supported within the bogie axle, and comprising means for securing the supporting arm upon the bogie axle in a desired angular position thereabout, a sleeve mounted upon the supporting arm of the tool holder, a driving screw extending axially within the supporting arm and the bogie axle, means on the sleeve for threadedly engaging the driving screw, and means on the device for rotatably driving said screw.

7. A portable working device as claimed in claim 1, comprising at least one ring-like cam mounted upon the bogie axle for rotation with respect thereto about the axis of the bogie axle, a radially reciprocable cam follower mounted on the supporting arm for cooperation with the cam, the cam having such configuration that when turned in one direction it thrusts the cam follower radially outwardly so that the outer end of the cam follower engages the workpiece to thrust the device away from the surface of the workpiece, and that turning of the cam in the opposite direction causes the cam follower to travel inwardly with respect to the cam, whereby the supporting traveling wheels of the device are then lowered into engagement with the workpiece.

8. A portable working device as claimed in claim 7, wherein there are two similar axially spaced cams on the axle each provided with a cooperating cam follower, and comprising means for connecting the cams for joint rotation about the axis of the bogie axle.

9. A portable working device as claimed in claim 1, comprising a direction detecting pick-up device fixed on the bogie axle.

10. A portable working device as claimed in claim 1, comprising a position pick-up device provided on the supporting arm of the tool holder.

* * * * *